United States Patent [19]
Ishijima

[11] Patent Number: 5,050,171
[45] Date of Patent: Sep. 17, 1991

[54] BURST ERROR CORRECTION APPARATUS

[75] Inventor: Tomoharu Ishijima, Tokyo, Japan

[73] Assignee: Kabushiki Kaisha CSK, Tokyo, Japan

[21] Appl. No.: 444,159

[22] PCT Filed: Feb. 9, 1989

[86] PCT No.: PCT/JP89/00129
§ 371 Date: Nov. 13, 1989
§ 102(e) Date: Nov. 13, 1989

[87] PCT Pub. No.: WO89/07825
PCT Pub. Date: Aug. 24, 1989

[30] Foreign Application Priority Data
Feb. 16, 1988 [JP] Japan .................... 63-33813

[51] Int. Cl.$^5$ .......................... G06F 11/10
[52] U.S. Cl. ................... 371/47.1; 371/39.1
[58] Field of Search .......... 371/47.1, 42, 39.1; 375/106, 108, 110; 360/51, 53

[56] References Cited

U.S. PATENT DOCUMENTS

| | | | |
|---|---|---|---|
| 3,893,171 | 7/1975 | Marshall | 360/45 |
| 3,938,086 | 2/1976 | Valbonesi | 371/42 |
| 4,959,834 | 9/1990 | Aikawa | 371/47.1 |
| 4,975,916 | 12/1990 | Miracle | 371/47.1 |

Primary Examiner—Robert W. Beausoliel
Attorney, Agent, or Firm—Max Fogiel

[57] ABSTRACT

A burst error correction apparatus suitable for correcting burst error due to a bit slip in a self-clocking signal containing resync codes at predetermined intervals, e.g., a self-clocking signal read out from a digital recording medium before the signal is demodulated. This apparatus has a shift register for receiving the self-clocking signal in series; a detector for detecting, an inhibited pattern which has not existed in the self-clocking signal in response to parallel outputs from a section in the vicinity of the entrance of the shift register; and a controller for shifting, by respectively controlling clocks applied to the shift register and a rear stage of the same, data appearing from a position in the vicinity of the inhibited code between adjacent resync codes to the subsequent one of these resync codes in accordance with the direction and the number of bits based on a detection signal from the detection means. The apparatus enables data reading with improved accuracy even in a system inferior in accuracy by correcting burst error due to a bit slip in a self-clocking signal containing resync codes at predetermined intervals before this signal is demodulated, and also enables, with respect to a system improved in accuracy, a reduction in the number of redundant data items for error detection/correction.

6 Claims, 10 Drawing Sheets (EXAMPLE OF -1-BIT SLIP)

ORIGINAL DATA    1 0 0 1 0 0 1 0 0 1 0 0 1 0 0 1 0 0

RECEIVED DATA    1 0 0 1 0 1 0 0 1 0 0 1 0 0 1 0 0 1

BIT SLIP GENERATION PONT (EXAMPLE OF +1-BIT SLIP)

ORIGINAL DATA    1 0 0 1 0 0 1 0 0 1 0 0 1 0 0 1 0 0

RECEIVED DATA    1 0 0 1 0 0 1 1 0 0 1 0 0 1 0 0 1 0

BIT SLIP GENERATION PONT (EXAMPLE OF CORRECTION OF -1-SLPI)

(EXAMPLE OF CORRECTION OF +1-SLPI)

(2.7RLL)

| ORIGINAL DATA BIT | CHANNEL BIT |
|---|---|
| 10 | 0100 |
| 010 | 100100 |
| 0010 | 00100100 |
| 11 | 1000 |
| 011 | 001000 |
| 0011 | 00001000 |
| 000 | 000100 |

(2.7RLL)

AFTER MODULATION 2.5T    2T   1.5T

CHANNEL BIT EXPRESSION   0100001000100100

RL        4    3   2

BURST ERROR CORRECTION APPARATUS

DESCRIPTION

1. Technical Field

This invention relates to a burst error correction apparatus suitable for correcting burst error due to a bit slip in a self-clocking signal containing resync codes at predetermined intervals, e.g., a self-clocking signal read out from, for example, a digital recording medium before this signal is demodulated.

2. Background Art

Conventionally, as is well-known, digital data to be recorded on a magnetic or optical recording medium is converted into or modulated to a signal form suitable for recording/reproduction of the digital data.

There are typical examples of system applied to this modulation: MFM (modified frequency modulation) system; 2.7 RLL (run length limited code) system; and EFM (eight to four-teen modulation) system. All signals modulated by these modulation systems are signals in which data bits and clock bits are basically indistinguishable from each other and which are codes which generate clock on the basis of their own data. That is, they are self-clocking signals. These codes are in common with each other in the following respects. The number of bits after the modulation (channel bits) is larger than that before the modulation, and the formation of any succession of "1" is avoided. The number of "0" between "1"s is called run length (RL). For example, the RL varies as MFM . . . 1 to 3

2.7 RLL . . . 2 to 7

EFM . . . 2 to 10 (margin bits: two bits)

If the RL is excessively long, following-up of the PLL (phase locked loop) circuit for the reproduction of clock becomes difficult. If the RL is excessively short, interbit interference becomes large.

FIG. 10 shows an example of modulation of data 9 Ah (h designates hexadecimal) based on the MFM system. That is, 1-byte data "10011010" is converted into channel bits of 2-byte channel bits "0100 1001 0100 0100" on the basis of the principle of this system.

FIG. 11 shows a table of conversion correspondence in the case of the 2.7 RRL system, and FIG. 12 shows an example of modulation of data 9 Ah (h designates hexadecimal) based on the 2.7 RRL system. It is understood that in this example 1-byte data "10011010" is converted into 2-byte channel bits "0100 0010 0010 0100" in accordance with the relationship shown in FIG. 11.

For reproduction of original data from such a self-clocking signal, a PLL circuit or the like is ordinarily used to generate clock on the side of the reader. There is a possibility of a temporary disturbance of the clock timing under the influence of something (e.g., scratch on the recording medium) such that, after the occurrence of disturbance, data is read out by the timing shifted by 1 to several bits. This phenomenon is called bit slip. In such a case, the data subsequent to the point at which the clock timing is temporarily disturbed (bit slip occurrence point) is generally all treated as error (burst error due to bit slip) because the data partitions are shifted.

A conventional method of limiting the length of this burst error is known in which a specific pattern for effecting resynchronization (i.e., resync code) is previously written at a predetermined position, whether or not this resync code is located at the predetermined position is determined during reading, and, in a case where it is located within a range of several bits before and behind the predetermined position but is not located right at this position, the occurrence of a bit slip is recognized, thereby enabling the data subsequent to the resync code to be read correctly.

There have been proposed formats using this type of resync code, e.g., ISO-DIS 9171-1, ISO-DIS 9171-2 for post-write type of optical disks, as described on pp 75 to 76 of NIKKEI ELECTRONICS, 1987, 11.2 (No. 433).

FIG. 13 shows a schematic diagram of a data field of a post-write type of optical disk for processing with 2.7 RLL modulation. In FIG. 13, SYNC represents 3-byte data for synchronization, D0 to D1023 represent user data of 1024 bytes, CD0 to CD11 represent control data, CRC represents 4-byte user CRC data, P0,0 to P9,15 represents parity codes of 160 bytes (read solomon code (LDS-RS)), and R represents 1-byte resync code (hereinafter referred to as simply resync), each 1 byte being placed every 20 bytes. The longitudinal direction of FIG. 13 corresponds to one series of LDC-RS, and the depth of interleave is 10. Therefore 10 byte continuous error containing no resync can be regarded as 1-byte error in terms of each series.

The resync code R shown in FIG. 13 has a structure: "0010 000 0010 0100". This is an inhibition code of 2.7 RLL modulation.

This construction ensures that even if a bit slip takes place between adjacent resyncs, resynchronization can be effected at the subsequent resync. Even if an error takes place with respect to one resync and if a bit slip occurs at the same time, the error can be corrected, because the amount of error with respect to one series is at most 4 byte while ability to correct error of 8 bytes with respect to one series is provided.

In the above-described conventional art, no means has been provided to correct burst error of data between the bit slip occurrence point and the next resync code, and the need to do so has been little. This can be said with respect to the above-mentioned type of optical disk, but it is preferable to retrieve data from burst error due to the above-mentioned bit slip with respect to a recording medium inferior in reading accuracy, e.g., an optical card or to a case where reading must be performed under unfavorable conditions.

DISCLOSURE OF THE INVENTION

It is an object of the present invention to provide a burst error correction apparatus which enables data reading with improved accuracy even in a system inferior in accuracy by correcting burst error due to a bit slip in a self-clocking signal containing resync codes at predetermined intervals before this signal is demodulated, and which enables, with respect to a system improved in accuracy, a reduction in the number of redundant data items for error detection/correction.

To attain this object, the present invention provides, as shown in FIG. 1, a burst error correction apparatus for correcting burst error due to a bit slip in a self-clocking signal containing resync codes at predetermined intervals before this signal is demodulated, the apparatus having:

a shift register for receiving the self-clocking signal in series;

a detection means for detecting, in response to parallel outputs from a section in the vicinity of an entrance of the shift register, an inhibited pattern which has not existed in the self-clocking signal; and a means for shifting, by respectively controlling clocks applied to the shift register and a rear stage of the shift register, data appearing from a position in the vicinity of the inhibited pattern between adjacent resync codes to the subsequent one of these resync codes in accordance with the direction and the number of bits based on a detection signal from the detection means.

The detection means produces, for example, a detection signal differing with respect to a plurality of different inhibited patterns, and the control means operates, in accordance with an example of its construction, to transmit the bit output from the shift register to the rear stage while partially duplicating the bit output or eliminating part of the same in response to the detection signal.

The present invention provides another burst error correction apparatus for correcting burst error due to a bit slip in a self-clocking signal containing resync codes at predetermined intervals before this signal is demodulated, the apparatus having:

a shift register for receiving the self-clocking signal in series;

a detection means for detecting the resync codes in the self-locking signal in response to parallel outputs from a section in the vicinity of the entrance of the shift register; and a control means for detecting the direction and the number of bits on the basis of a detection signal from the detection means and shifting the latter half of data between adjacent resync codes where the bit slip takes place in accordance with the direction and the number of bits of the bit slip by respectively controlling the shift register and clock applied to the same.

The control means operates, in accordance with an example of its construction, to transmit the bit output from the shift register to the rear stage while partially duplicating the bit output or eliminating part of the same in accordance with the direction and the number of bits of the bit slip.

The present invention provides still another burst error correction apparatus for correcting burst error due to bit slip in a self-clocking signal containing resync codes at predetermined intervals before this signal is demodulated, the apparatus having:

a shift register for receiving the self-clocking signal in series;

a detection means for detecting, in response to parallel outputs from a section in the vicinity of the entrance of the shift register, the resync codes and an inhibited pattern which has not existed in the self-clocking signal; and a control means for detecting the direction and the number of bits on the basis of a detection signal from the detection means and respectively controlling clocks applied to the shift register and a rear stage of the shift register;

wherein, on the basis of the results of detection of the inhibited pattern and the position at which the inhibited pattern is detected, the control means shifts data appearing from a position in the vicinity of the inhibited pattern between adjacent resync codes to the subsequent one of these resync codes in accordance with the direction and the number of bits based on a detection signal from the detection means, or the control means shifts the latter half of data between the adjacent resync codes where the bit slip takes places in accordance with the direction and the number of bits of the bit slip by controlling clocks to the shift register and the rear stage.

The control means operates, in accordance with an example of its construction, to detect whether the inhibited pattern has appeared in the first or second half of the data between the adjacent resync codes, and effect the shifting based on the detection of the resync code without performing the shifting based on the detection of the inhibited pattern if the inhibited pattern has appeared in the first half data, or effect the shifting based on the detection of the inhibited pattern without performing the shifting based on the detection of the resync code if the inhibited pattern has appeared in the latter half data, or effect the shifting based on the detection of the resync code if the inhibited pattern is not detected.

The present invention is based on the finding that, on condition that the bit slip occurrence point and the direction and the number of bits of a bit slip are known, it is possible to correct the burst error due to the bit slip by shifting the data between the bit slip occurrence point and the subsequent resync code in the direction opposite to the direction of the bit slip to the extent corresponding to the number of bits thereof.

In practice, however, it is extremely difficult to detect with accuracy the position at which the bit slip takes place.

In accordance with the present invention, therefore, two techniques are provided, as described below.

An inhibited pattern of the self-clocking signal (which is supposed to be excluded in the ordinary state) frequently appears at the bit slip occurrence point. In accordance with the first technique, such an inhibited pattern is detected, and a position in the vicinity of the position at which the inhibited pattern is detected is regarded as the bit slip occurrence point.

In accordance with the second technique, a position in the vicinity of the center of data between the immediately preceding resync code and the present resync code (in the case of the initial resync code, between the head of the data and the resync code) is at any rate regarded as the bit slip occurrence point.

The first technique is advantageous in that it is possible to cope with the bit slip no matter what the position at which the bit slip takes place between adjacent resyncs. However, it is not always certain that an inhibited pattern appears at the bit slip occurrence point. If so, correction is not performed. In addition, the inhibited pattern is also caused by a random error, resulting in erroneous correction. In particular, where an inhibited pattern due to a random error takes place at an initial time point between the interval of adjacent resyncs, the degree of defect resulting from the erroneous correction is large.

The second technique is free from such a problem since only the direction of occurrence of the bit slip and the number of bits of the same are detected. The second technique becomes most effective if the actual bit slip occurrence point is located at the center of adjacent resync codes, but it is disadvantageous in other cases. If the bit slip takes place at a time point before the center of the adjacent resync codes, the data between this time point and the center is not corrected; if the bit slip takes place at a time point after the center, the data between the center and this time point is changed although it is normal. However, there is no possibility of the maximum error length becoming larger than half of that of the data between the adjacent resyncs. In accordance with the second technique, it is possible to detect the direction of occurrence of a bit slip and the number of bits of the same by counting, for example, the number of bits between the adjacent resync codes on the basis of the detection of the resync codes.

Thus, the optimum burst error correction effects of the first and the second technique are not always ensured, but these techniques are effective on the average compared with the conventional example having no specific means to cope with the problems.

The present invention provides a more preferable technique which is a compromise between the first and second techniques and which has both the advantages of the first and second techniques. In accordance with this third technique, one of the first and second techniques is selected depending upon whether or not any inhibited pattern has appeared and whether the position at which an inhibited pattern has appeared is located in front or rear of the center of the interval between adjacent resyncs. If the inhibited pattern has appeared after the center of the section between the adjacent resyncs, the first technique is used; if the inhibited pattern has appeared before the center of this section, the second technique is used. It is thereby possible to limit the range of erroneous correction to at most half the data defined within that section with respect to either of the first and second techniques. That is, the burst error length becomes stable on the average and at most equal to or smaller than half of that of the data within that section.

BEST MODE FOR CARRYING OUT THE INVENTION

A preferred embodiment of the present invention will be described below in detail with reference to the accompanying drawings.

Construction of the Embodiment

Figure 2:
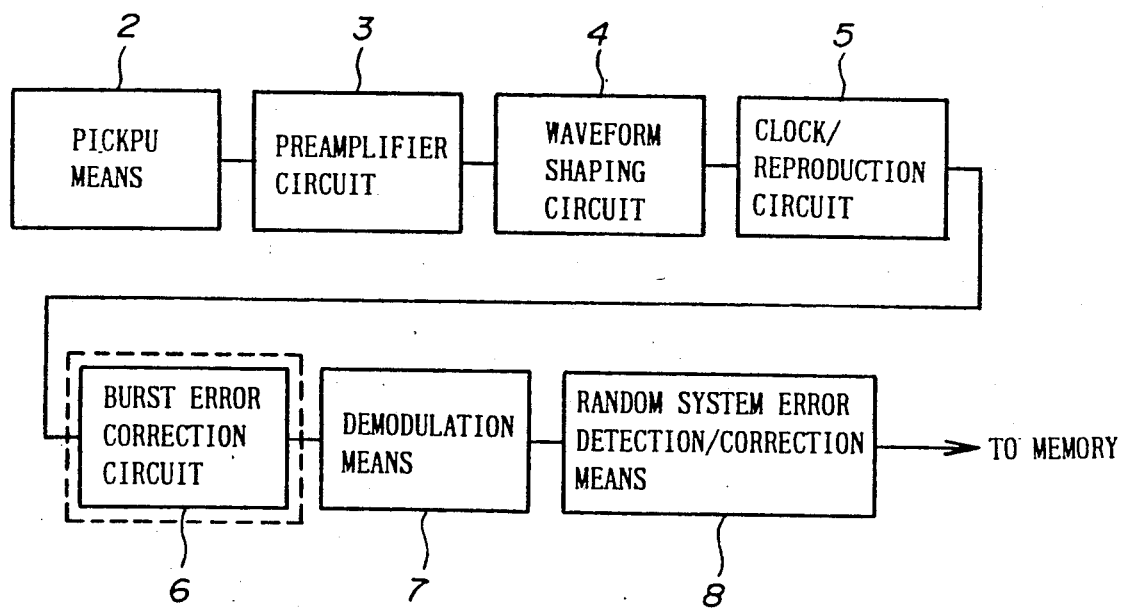
FIG. 2 is a block diagram of an apparatus to which the present invention is applied.

FIG. 2 shows the construction of a type of apparatus to which the present invention is applied. This apparatus is a reader apparatus for reading an optical memory card, having a pickup means 2 for detecting recording data from the surface of the optical memory card, a preamplifier circuit 3 for amplifying the output from the pickup means 2, a waveform shaping circuit 4 for shaping the waveform output from the preamplifier circuit 3, a clock/reproduction circuit 5 for taking clock out of the output from the waveform shaping circuit 4 and reproducing digital data, a demodulation means 7 for demodulating data output from the clock/reproduction circuit 5, and a random system error detection/correction means 8 for detecting and correcting a random error in the output from the demodulation means 7 and supplying the corrected output to, for example, a memory. In this embodiment, a burst error circuit 6 in accordance with the present invention is inserted between the clock/reproduction circuit 5 and the demodulation means 7, as indicated in the broken line block of FIG. 2.

Figure 1:
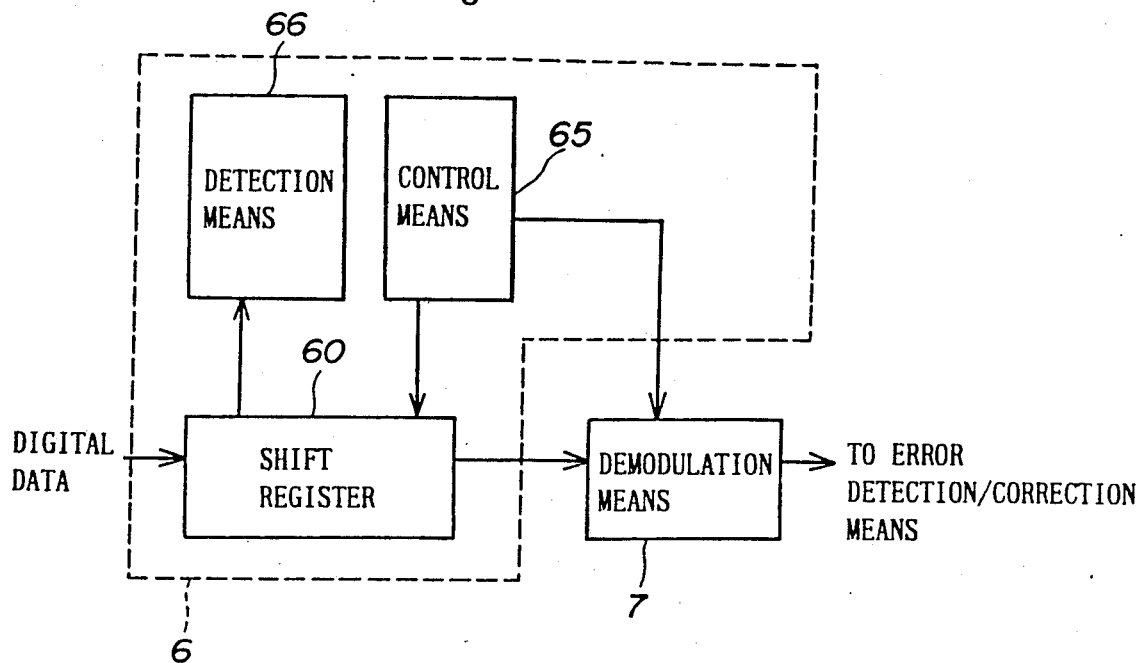
FIG. 1 is a block diagram of the construction of the present invention.
Figure 3:
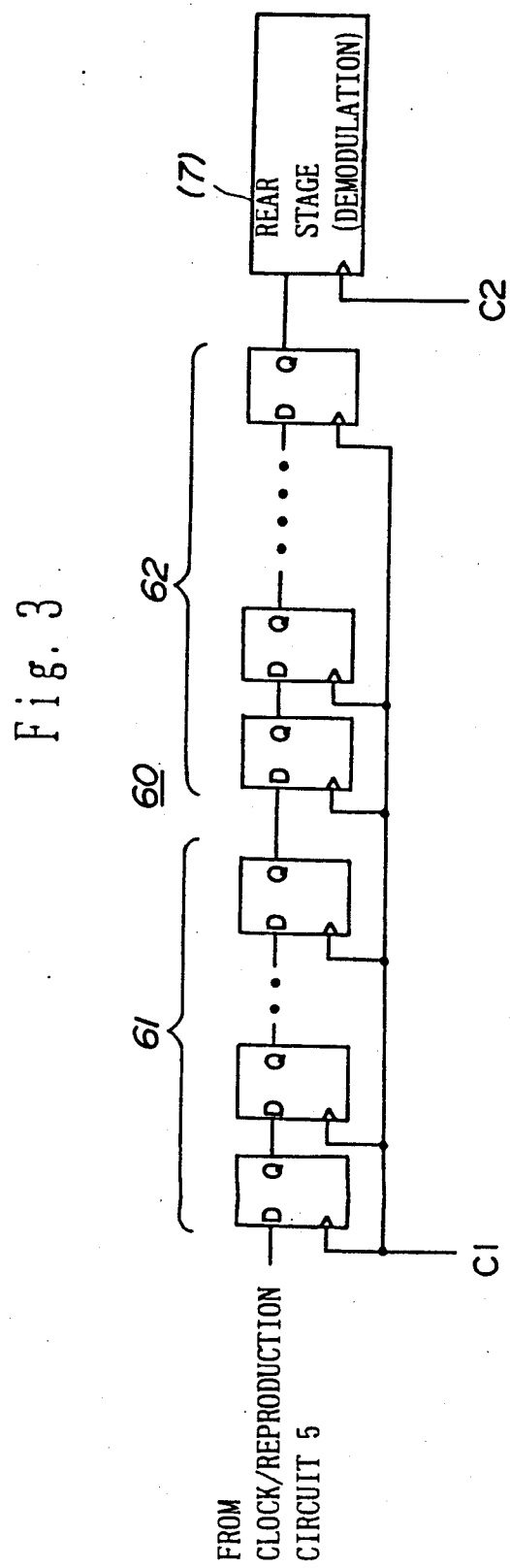
FIG. 3 is a circuit diagram of an example of the shift register shown in FIG. 1.

FIG. 3 shows an example of the shift register 60 shown in FIG. 1. In this example, the shift register 60 is constituted by a plurality of D-flip-flops (F/F). In this example, the modulation circuit 7 is disposed at the rear of the shift register 60. Clocks Cl and C2 which are respectively controlled by the control means 65 shown in FIG. 1 are applied to the shift register 60 and the rear stage 7 through respective control terminals. The number of F/Fs constituting a front section 61 of the shift register 60 corresponds to the number of bits necessary for detection of a resync code and inhibited patterns. The number of F/Fs constituting a rear section 62 of the shift register 60 is equal to or larger than the number of bits of data between adjacent resyncs or, in some case, equal to or larger than half the same.

It is possible that the control means 65, which is not specifically illustrated, will be easily formed of logic circuits or a microprocessor by those skilled in the art on the basis of the operation described below.

Figure 4:
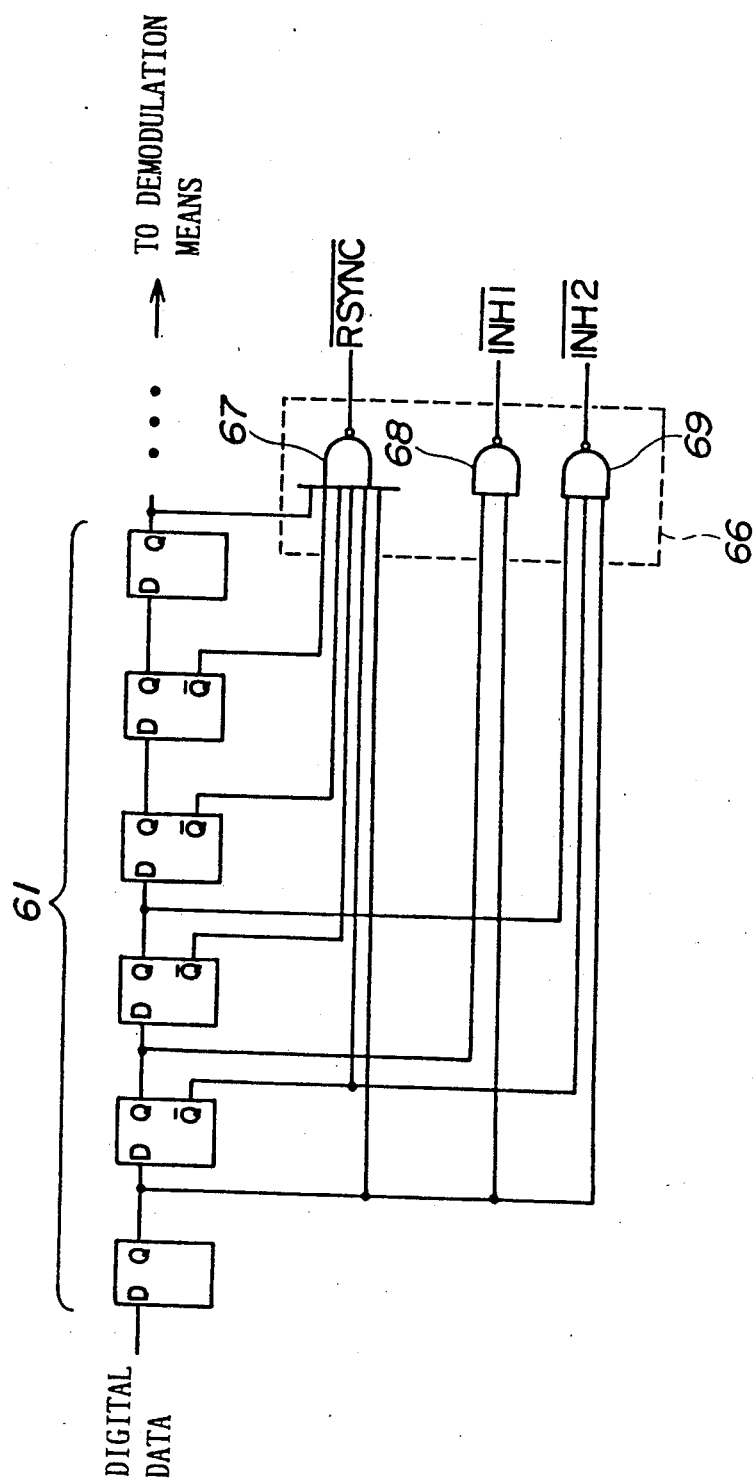
FIG. 4 is a circuit diagram of an example of the detection means shown in FIG. 1 along with the shift register shown in FIG. 3.

FIG. 4 shows an example of the detection means 66 shown in FIG. 1. The detection means 66 receives parallel outputs from the front section 61 of the shift register 60. A NAND gate 67 detects a resync code having a predetermined pattern and outputs $\overline{\text{RSYNC}}$ when it detects the resync code which is "100001" in this example. The NAND gates 68 and 69 respectively detect different inhibited patterns and output INH1 and INH2 when they detect the inhibited patterns. In this example, "11 and "101" are selected as inhibited patterns of the 2.7 RLL code, but other patterns may be detected in addition to these patterns.

Operation of the Embodiment

First, burst error correction based on the above-described first technique, that is, the detection of inhibited patterns will be described below.

Clocks Cl and C2 to the shift register 60 and the rear stage 7 shown in FIG. 3 are ordinarily generated by the same timing.

Figure 5:
FIGS. 5 and 6 are diagrams illustrating examples of plus and minus bit slips.
Figure 7:
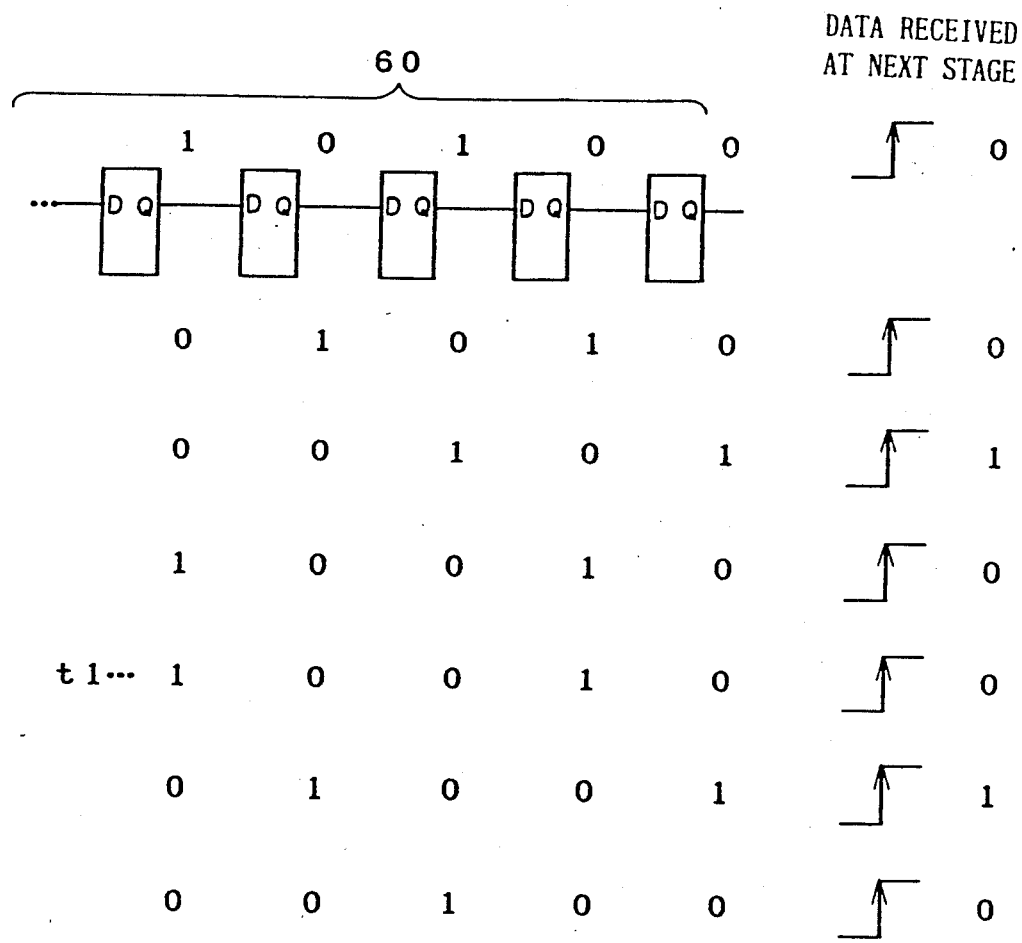
FIGS. 7 and 8 are diagrams illustrating operations of correcting bit slips shown in FIGS. 5 and 6.

If, in original data such as that shown in FIG. 5 in which no bit slip has occurred, −1 bit slip takes place at the bit slip occurrence point indicated in FIG. 5, an inhibited pattern "101" which does not exist in the 2.7 RLL code is generated, and this inhibited pattern is detected by the NAND gate 69 shown in FIG. 4. The control means 65 recognizes the −1 bit slip when supplied with the output from the NAND gate 69, and controls clocks Cl and C2 supplied to the shift register 60 and the rear stage 7 so as to restore the original data. That is, as shown in FIG. 7, clock C is not generated with respect to one clock of clock C2 at a time point tl at which "0" of "101" appears immediately before the rear stage 7 after "101" has been detected by the NAND gate 69. The data ("0") in the shift register 60 is thereby duplicated before it is transmitted to the rear stage 7. The succeeding data is thereby shifted rearward by one bit relative to the immediately precedent resync code.

Figure 6:
Figure 8:
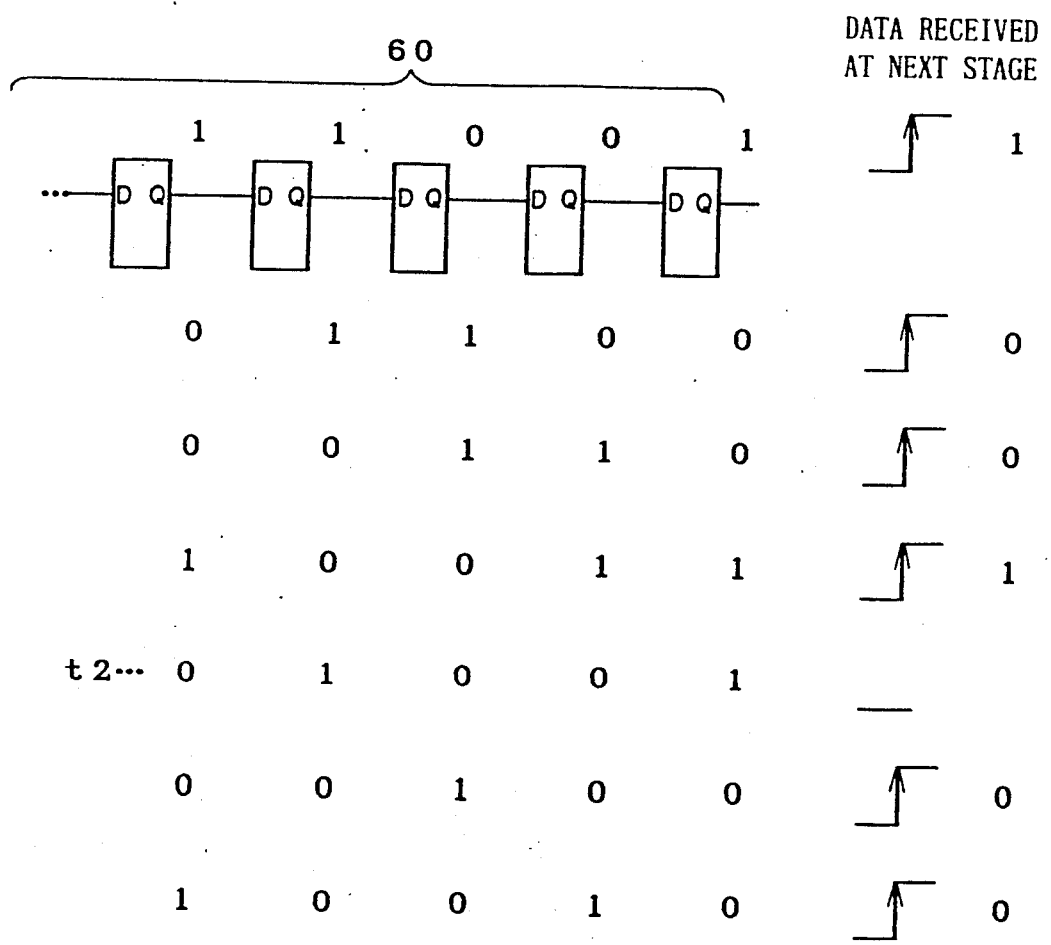

Conversely, if, in original data such as that shown in FIG. 6 in which no bit slip has occurred, +1 bit slip takes place at the bit slip occurrence point indicated in FIG. 6, an inhibited pattern "11" which does not exist in the 2.7 RLL code is generated, and this inhibited pattern is detected by the NAND gate 68 shown in FIG. 4. The control means 65 recognizes the +1 bit slip when supplied with the output from the NAND gate 69, and controls clocks C1 and C2 supplied to the shift register 60 and the rear stage 7 so as to restore the original data. That is, as shown in FIG. 8, clock C2 is not generated with respect to one clock of clock C1 at a time point t2 at which "0" of "101" appears immediately before the rear stage 7 after the NAND gate 68 has detected "11". The data ("1") in the shift register 60 is thereby eliminated before it is transmitted to the rear stage 7. The succeeding data is thereby shifted forward by one bit relative to the immediately precedent resync code.

Next, the above-described second technique will be described below.

Figure 9:
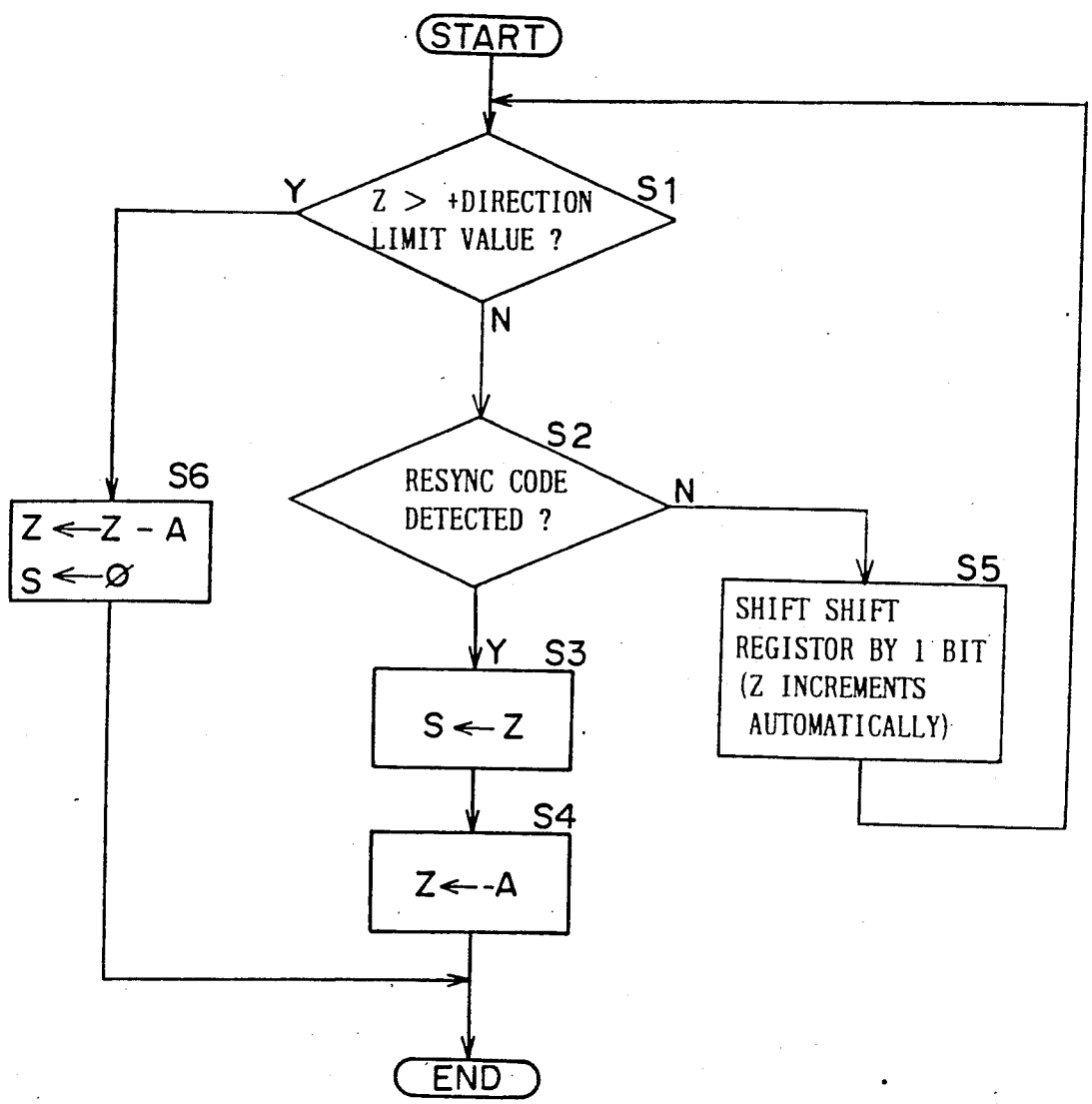
FIG. 9 is a flow chart of a process of obtaining the direction and the number of bits of a bit slip.
Figure 10:
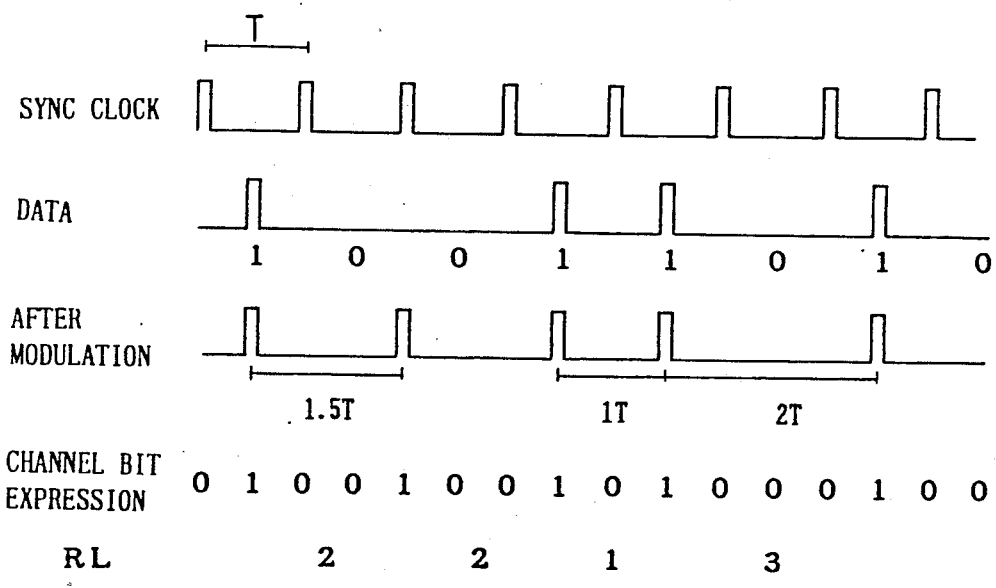
FIG. 10 is a diagram illustrating MFM demodulation system.
Figures 11, 12:
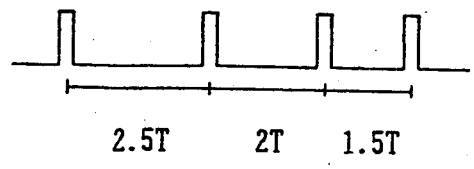
FIGS. 11 and 12 are diagrams illustrating 2.7 RLL modulation system.
Figure 13:
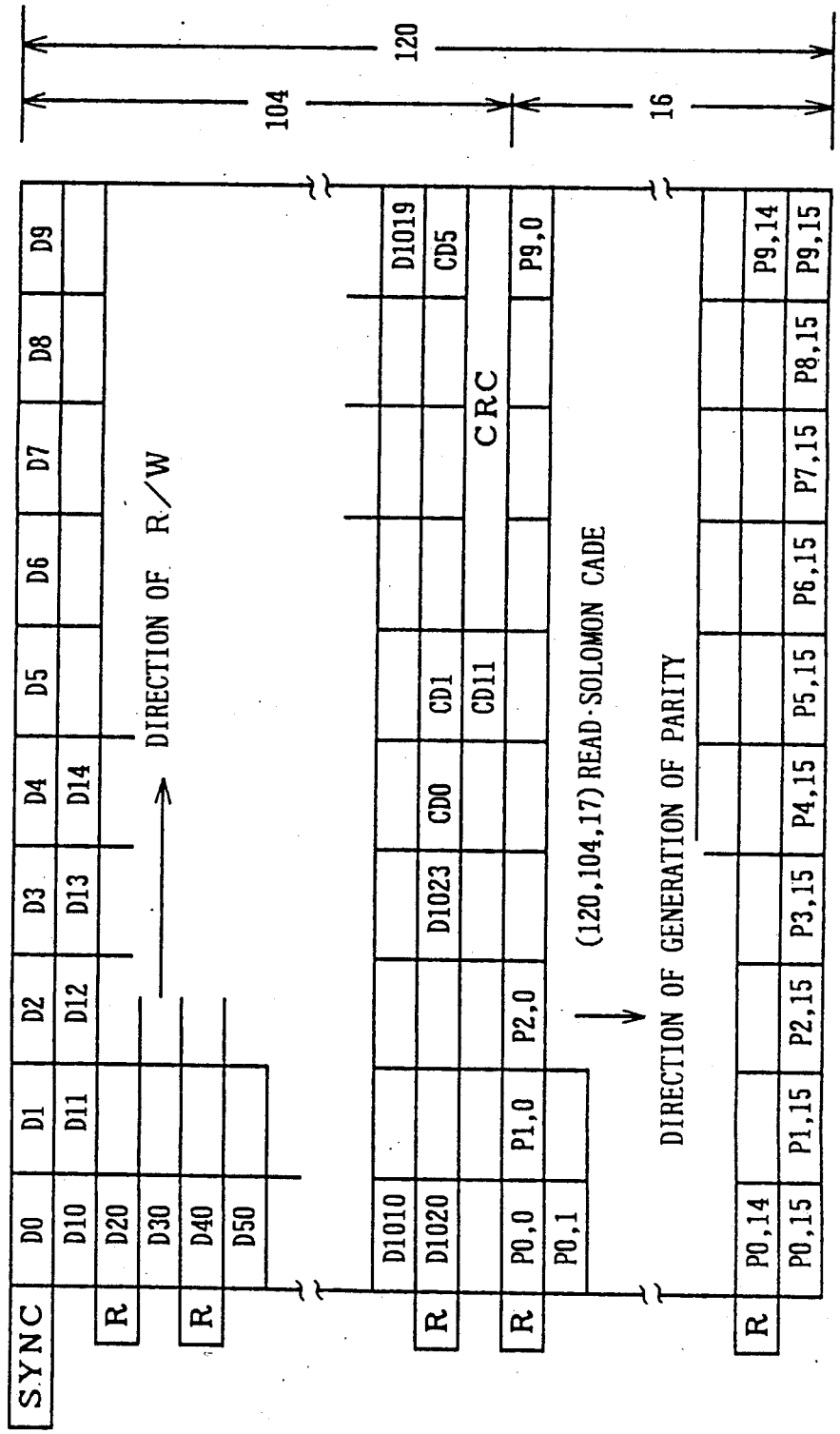
FIG. 13 is a schematic diagram of a data field in accordance with a conventional example to which the conventional 2.7 RLL modulation system is applied.

The control means 65 counts the number of bits between a pair of adjacent resyncs in accordance with the flow chart shown in FIG. 9 and calculates the difference between the final counted value and a predetermined value. A sign attached to this difference designates the direction of a bit slip while the absolute value represents the number of bits. That is, in FIG. 9, a variable Z represents the counted value, a variable S is a variable in which the number of bits with a sign is stored as the result of counting, and A represents the number of normal bits of the data between the adjacent resyncs.

In the initial state, the variable Z is set to $-A$, and the variable S is set to 0. In step S1, whether or not the value Z is larger than a + direction limit value is detected. This limit value represents the predetermined maximum value of the number of bits for retrieve from bit slip. Step S1 is provided as processing required in the case where, after the start of counting, the resync code to be detected next cannot be found for a period of time. In the loop between steps S2, S5, and S1, the shift register 60 is shifted by one bit at a time until the next resync code is detected, while the variable Z is incremented. When the resync code is detected in step S2, the process proceeds to step S3, and the present counted value Z is stored in the variable S. Then, in step S4, the variable Z is set to $-A$ to prepare for the next counting. If in step S1 the value Z exceeds the +direction limit value, the value Z is set to Z $-A$ while the value S is set to 0, in step S6. The process is then terminated.

The control means 65 shifts the latter half of the data between the adjacent resyncs on the basis of the value of the variable S on condition that the value of the variable S is not 0 and that, if this value is negative, the absolute value is smaller than the predetermined limit value. That is, when the latter half of the data between the adjacent resyncs is just ready to enter the rear stage 7 while being left in the rear section 62 of the shift register 60 shown in FIG. 3, the control means 65 controls clocks C1 and C2 to the second stage 62 and the third stage 63 to shift the latter half of the data relative to the immediately precedent resync in accordance with the value of the variable S. This shifting can be effected in the same manner as that described above with respect to FIGS. 7 and 8. In view of these conditions, it is necessary to set the number of F/Fs in the rear section 62 to at least half the number of data bits between the adjacent resyncs. However, it is not necessary to set the shifting bit position strictly to the center of the adjacent resyncs, because only one unit of data is sacrificed even if the shift from the center is several bits.

In accordance with the above-described third technique, the control means 65 determines whether or not the position at which an inhibited pattern is generated is within the first half or the second half of data between the adjacent resyncs, and executes the process in accordance with the first technique if that position is within the second half or executes the process in accordance with the second technique if the position is within the first half. If no inhibited pattern is found, the second process is executed. For instance, if the data between the adjacent resyncs is of 20 bytes as represented by $D_0$ to $D_{19}$, and if the inhibited pattern is detected on and after $D_{10}$, data between the detecting position and $D_{19}$ is shifted on the basis of the inhibited pattern. If the inhibited pattern is detected before $D_{10}$, or if it is not detected, data between $D_{10}$ and $D_{19}$ is shifted in accordance with the value of the variable S.

In accordance with the first technique, in the example shown in FIG. 6, it is possible to regard the inhibited pattern "11" as $-2$ bit slip. In this case, the state of bit slip is determined by counting the number of bits of data between the adjacent resyncs and referring to the value of the variable S, without performing correction before the detection of the next resync code. Thereafter, correction can be performed between the shift register 60 and the rear stage 7. If data shifting is performed in the first half of the adjacent resyncs by using the inhibited patterns on the basis of this first technique, it is necessary to set the number of F/Fs at least to a value corresponding to the number of bits of data between the adjacent resyncs.

The above embodiments have been described with respect to real time processing based on hardware. However, it is possible to execute similar burst error correction based on software after digital data which has not undergone demodulation has been temporarily stored in a memory.

What is claimed is:

1. A burst error correction apparatus for correcting burst error due to a bit slip in a self-clocking signal containing resync codes at predetermined intervals before the signal is demodulated, said apparatus comprising:
   a shift register for receiving the self-clocking signal in series;
   a detection means for detecting, in response to parallel outputs from a section adjacent to an entrance of said shift register, an inhibited pattern which has not exited in the self-clocking signal; and
   a control means for shifting, by respectively controlling said clocks applied to said shift register and a rear stage of said shift register, data appearing from a position adjacent to the inhibited code between adjacent resync codes to a subsequent one of these resync codes in accordance with a direction and a number of bits based on a detection signal from said detection means.

2. A burst error correction apparatus according to claim 1, wherein said detecting means produces a detection signal differing with respect to at least one different inhibited pattern, and said control means transmits a bit output from said shift register to said rear stage while partially duplicating the bit output or eliminating part of the bit output in response to said detection signal.

3. A burst error correction apparatus for correcting burst error due to a bit slip in a self-clocking signal containing resync codes at predetermined intervals before the signal is demodulated, said apparatus comprising:
- a shift register for receiving the self-clocking signal in series;
- a detection means for detecting the resync codes in the self-locking, signal in response to parallel outputs from a section adjacent to an entrance of said shift register; and
- a control means for detecting a direction and a number of bits on basis of a detection signal from said detection means and shifting a latter half of data between adjacent resync codes where the bit slip takes place in accordance with the direction and the number of bits of the bit slip by respectively controlling clocks applied to said shift register and a rear stage of said shift register.

4. A burst error correction apparatus according to claim 3, wherein said control means transmits the bit output from said shift register to the rear stage while partially duplicating the bit output or eliminating part of the same in accordance with the direction and the number of bits of the bit slip.

5. A burst error correction apparatus for correcting burst error due to a bit slip in a self-clocking signal containing resync codes at predetermined intervals before the signal is demodulated, said apparatus comprising:
- a shift register for receiving the self-clocking signal in series;
- a detection means for detecting, in response to parallel outputs from a section adjacent to an entrance of said shift register, there sync codes and an inhibited pattern which has not existed in the self-clocking signal; and
- a control means for detecting a direction and a number of bits on the basis of a detection signal from said detection means and respectively controlling clocks applied to said shift register and a rear stage of said shift register;
- wherein, on as is of results of detection of the inhibited pattern and position at which the inhibited pattern is detected, said control means shifts data appearing from a position adjacent to the inhibited pattern between adjacent resync codes to a subsequent one of these resync codes in accordance with the direction and the number of bits based on a detection signal from said detection means, or said control means shifts a later half of data between the adjacent resync codes where the bit slip takes places in accordance with the direction and the number of bits of the bit slip by controlling clocks to said shift register and said rear stage.

6. A burst error correction apparatus according to claim 5, wherein said control means detects whether the inhibited pattern has appeared in a first or second half of the data between the adjacent resync codes, and effects the shifting based on the detection of the resync code without performing the shifting based on the detection of the inhibited pattern if the inhibited pattern has appeared in the first half data, or effects the shifting based on the detection of the inhibited pattern without performing the shifting based on the detection of the resync code if the inhibited pattern has taken place in a latter half data, or effects the shifting based on the detection of the resync code if the inhibited pattern is not detected.

* * * * *